United States Patent
Veregin et al.

(10) Patent No.: US 11,795,333 B2
(45) Date of Patent: Oct. 24, 2023

(54) CROSSLINKED ORGANIC ADDITIVE FOR WATERBORNE COATING COMPOSITIONS

(71) Applicant: Xerox Corporation, Norwalk, CT (US)

(72) Inventors: Richard P. N. Veregin, Mississauga (CA); Kimberly D. Nosella, Ancaster (CA); Majid Kamel, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 219 days.

(21) Appl. No.: 17/317,085

(22) Filed: May 11, 2021

(65) Prior Publication Data

US 2022/0363920 A1 Nov. 17, 2022

(51) Int. Cl.
| | | |
|---|---|---|
| *C09D 7/65* | (2018.01) | |
| *C09D 7/40* | (2018.01) | |
| *C09D 7/41* | (2018.01) | |
| *C08F 2/24* | (2006.01) | |
| *C08F 212/36* | (2006.01) | |
| *C08F 214/24* | (2006.01) | |
| *C08F 220/06* | (2006.01) | |
| *C08F 220/14* | (2006.01) | |
| *C08F 226/02* | (2006.01) | |
| *C08F 228/02* | (2006.01) | |

(52) U.S. Cl.
CPC .............. *C09D 7/65* (2018.01); *C08F 2/24* (2013.01); *C08F 212/36* (2013.01); *C08F 214/24* (2013.01); *C08F 220/06* (2013.01); *C08F 220/14* (2013.01); *C08F 226/02* (2013.01); *C08F 228/02* (2013.01); *C09D 7/41* (2018.01); *C09D 7/67* (2018.01); *C09D 7/68* (2018.01)

(58) Field of Classification Search
CPC ... C09D 7/65; C09D 7/67; C09D 7/68; C09D 7/41; C08F 2/24; C08F 212/36; C08F 214/24; C08F 220/06; C08F 220/14; C08F 226/02; C08F 228/02
See application file for complete search history.

(56) References Cited

U.S. PATENT DOCUMENTS

| | | |
|---|---|---|
| 8,663,886 B2 | 3/2014 | Vanbesien et al. |
| 10,358,557 B1 | 7/2019 | Veregin et al. |
| 10,725,394 B1 | 7/2020 | Veregin et al. |

(Continued)

FOREIGN PATENT DOCUMENTS

| | | |
|---|---|---|
| CN | 107446457 | 12/2017 |
| CN | 111087540 | 5/2020 |

(Continued)

OTHER PUBLICATIONS

Extended European Search Report for EP 22170382 dated Oct. 11, 2022; pp. 1-8.

(Continued)

*Primary Examiner* — Robert S Jones, Jr.
*Assistant Examiner* — Jiangtian Xu
(74) *Attorney, Agent, or Firm* — Bell & Manning, LLC

(57) ABSTRACT

Coating compositions are provided. In embodiments, a coating composition comprises a solvent system comprising water; a crosslinked organic additive in the form of particles and comprising a polymerization product of reactants comprising a multifunctional vinyl monomer comprising two or more vinyl groups; a binder; and optionally, one or more of a colorant and a wax. Methods of making and using the coating compositions are also provided.

20 Claims, 1 Drawing Sheet

(56) References Cited

U.S. PATENT DOCUMENTS

| | | | |
|---|---|---|---|
| 2007/0099814 A1 | 5/2007 | Tamori et al. | |
| 2011/0312240 A1 | 12/2011 | Amthor et al. | |
| 2012/0177884 A1* | 7/2012 | Jones | C09D 7/42 |
| | | | 427/256 |
| 2016/0090495 A1 | 3/2016 | Suzuki | |
| 2018/0273696 A1* | 9/2018 | Goto | G02B 5/0226 |
| 2019/0031638 A1 | 1/2019 | Beyer et al. | |
| 2019/0185687 A1* | 6/2019 | Bohling | C09D 133/04 |
| 2020/0306830 A1 | 10/2020 | Veregin et al. | |
| 2020/0307027 A1 | 10/2020 | Veregin et al. | |
| 2020/0308328 A1 | 10/2020 | Veregin et al. | |
| 2020/0308330 A1 | 10/2020 | Veregin et al. | |
| 2020/0310268 A1 | 10/2020 | Veregin et al. | |
| 2023/0046647 A1 | 2/2023 | Moffat et al. | |

FOREIGN PATENT DOCUMENTS

| | | |
|---|---|---|
| EP | 1921509 A1 | 5/2002 |
| EP | 1834995 A1 | 9/2007 |
| EP | 2546313 | 1/2013 |
| EP | 2913186 A1 | 9/2015 |
| EP | 3360907 | 8/2018 |
| EP | 3494954 | 6/2019 |
| EP | 3502196 A1 | 6/2019 |
| JP | 07072660 | 3/1995 |
| JP | H0762035 A | 3/1995 |
| WO | WO 2014/047089 A1 | 3/2014 |
| WO | WO 2014/201674 A1 | 12/2014 |
| WO | WO 2015/158649 | 10/2015 |
| WO | WO 2017/134002 | 8/2017 |
| WO | WO 2020/194136 | 10/2020 |
| WO | WO 2021/080772 A1 | 4/2021 |
| WO | WO 2021/099943 | 5/2021 |

OTHER PUBLICATIONS

Mckenzie, Andrew, et al. "Core (polystyrene)-Shell [poly (glycerol monomethacrylate)] particles." ACS Applied Materials & Interfaces 9.8 (2017): 7577-7590.

Canadian Examination Search Report for CA 3,157,033 dated Jul. 5, 2023, pp. 1-5.

* cited by examiner

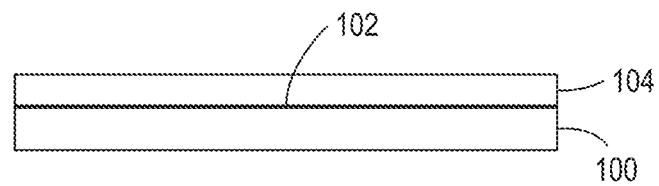

CROSSLINKED ORGANIC ADDITIVE FOR WATERBORNE COATING COMPOSITIONS

BACKGROUND

Waterborne coating compositions are the basis of a variety of products, such as paints and automobile finishes. Since they are based on water, they are generally more environmentally friendly and easier to apply as compared to coating compositions based on organic solvents. The application and properties of waterborne coating compositions depend upon its ingredients. Although a wide variety of ingredients may be used in waterborne coating compositions, silica is a ubiquitous additive for such compositions. Indeed, silica, as one of the most abundant minerals on earth, is a natural choice for an additive. Various types of silica are used to provide rheological control, reinforcement, scratch resistance, and gloss control.

SUMMARY

The present disclosure provides organic additives which may be used in waterborne coating compositions. The organic additives may be used to supplement, and in embodiments, completely replace, silica in waterborne coating compositions. Below, illustrative benefits and advantages of the organic additives are described. However, regardless of such benefits, the present disclosure is based, at least in part, on the surprising finding that the ability of the organic additives to achieve certain properties, e.g., gloss control, actually exceeds that of silica. This is surprising since the organic additives, composed of organic chemicals, are chemically very different from silica, composed of only Si and O.

Coating compositions are provided. In embodiments, a coating composition comprises a solvent system comprising water; a crosslinked organic additive in the form of particles and comprising a polymerization product of reactants comprising a multifunctional vinyl monomer comprising two or more vinyl groups; a binder; and optionally, one or more of a colorant and a wax. Methods of making and using the coating compositions are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1 shows a schematic of a substrate coated with a coating composition according to an illustrative embodiment.

DETAILED DESCRIPTION

Organic additives for use in waterborne coating compositions are provided. The coating compositions are also provided. In embodiments, a coating composition comprises water, an organic additive, and a binder. Other components may be included in the coating composition such as a colorant, a wax, and combinations thereof. Each of these components are described below.

The organic additives are polymeric materials in the form of small particles. A multifunctional vinyl monomer, i.e., comprising more than one vinyl polymerizable group (e.g., 2, 3, 4), is used to form the polymeric material of the organic additive. Multifunctional vinyl monomers achieve crosslinking within the organic additive. Multifunctional vinyl monomers comprising two or more vinyl groups may be used. Illustrative multifunctional vinyl monomers include the following: Bisphenol A ethoxylate diacrylate, Bisphenol A ethoxylate dimethacrylate, Bisphenol A dimethacrylate, Bisphenol A ethoxylate diacrylate, Methyl 2-(trifluoromethyl)acrylate, 10-Decanediol dimethacrylate, 1,10-Decanediol dimethacrylate, 1,4-Phenylene dimethacrylate, Pyromellitic dianhydrate dimethacrylate, Pyromellitic dianhydride glycerol dimethacrylate, Di(trimethylolpropane) tetraacrylate, Diurethane dimethacrylate, 1,3-Butanediol diacrylate, 1,4-Butanediol diacrylate, 1,3-Butanediol dimethacrylate, 1,4-Butanediol dimethacrylate, Poly(ethylene glycol) diacrylate, Glycerol 1,3-diglycerolate diacrylate, Glycerol dimethacrylate, Tri(propylene glycol) diacrylate, 1,6-Hexanediol diacrylate, 1,6-Hexanediol dimethacrylate, Neopentyl glycol diacrylate, Neopentyl glycol propoxylate, Pentaerythritol tetraacrylate, Pentaerythritol triacrylate, Poly(propylene glycol) diacrylate, Poly(propylene glycol) dimethacrylate, Trimethylolpropane ethoxylate (1 EO/OH) methyl ether diacrylate, Trimethylolpropane ethoxylate triacrylate, Trimethylolpropane propoxylate triacrylate, Trimethylolpropane triacrylate, Trimethylolpropane trimethacrylate, 1,4 Cyclohexanedimethanol divinyl ether, 1,4-Bis(4-vinylphenoxy)butane, Divinyl sulfone, divinyl benzene. A single type or combinations of different types of multifunctional vinyl monomers may be used.

Generally, an additional vinyl monomer is used to form the organic additive. By contrast to the multifunctional vinyl monomer, the additional vinyl monomer may be monofunctional having a single polymerizable vinyl group. Monomers which may be polymerized via emulsion polymerization methods may be used. These include acrylic monomers such as acrylates, acrylamides and methacrylamides, acrylic acids, acrylonitrile, bisphenol acrylics, fluorinated acrylics, and methacrylates; styrene and styrene monomers functionalized by other than vinyl polymerizable groups; and vinyl esters and vinyl ethers.

Specific illustrative additional vinyl monomers include the following: 2-Acrylamido-2-methyl-1-propanesulfonic acid, 2-Acrylamido-2-methyl-1-propanesulfonic acid, 3-(Acrylamido)phenylboronic acid, (3-Acrylamidopropyl) trimethylammonium chloride, 3-O-Acryloyl-1,2:5,6-bis-O-isopropylidene-D-glucofuranose, N-Acryloyl-L-valine, Alkylacrylamide, 2-Aminoethylmethacrylamide hydrochloride, N-(3-Aminopropyl)methacrylamide hydrochloride, N,N-Diethylacrylamide, N,N-Diethylmethacrylamide, N,N-Dimethylacrylamide, N-[3-(Dimethylamino)propyl]methacrylamide, N,N'-Hexamethylenebis(methacrylamide), N-Hydroxyethyl acrylamide, N-(Hydroxymethyl)acrylamide, (4-Hydroxyphenyl)methacrylamide, 2-Hydroxypropyl methacrylamide, N-(Isobutoxymethyl)acryl amide, N-Isopropylacrylamide, N-Isopropylacrylamide, N-Isopropylmethacrylamide, Methacrylamide, N-(3-Methoxypropyl) acrylamide, N-Phenylacrylamide, N-(Triphenylmethyl) methacrylamide, N-[Tris(hydroxymethyl)methyl] acrylamide, 4-Acetoxyphenethyl acrylate, 6-Acetylthiohexyl methacrylate, Acrylic anhydride, Acryloxyethyl thiocarbamoyl rhodamine B, Acryloyl chloride, 4-Acryloylmorpholine, [2-(Acryloyloxy)ethyl]trimethylammonium chloride, 2-(4-Benzoyl-3-hydroxyphenoxy)ethyl acrylate, Benzyl acrylate, Benzyl 2-propylacrylate, Butyl acrylate, tert-Butyl acrylate, 2-[[(Butylamino)carbonyl]oxy] ethyl acrylate, tert-Butyl 2-bromoacrylate, 2-Carboxyethyl acrylate, 2-Chloroethyl acrylate, 2-(Diethylamino)ethyl acrylate, Di(ethylene glycol) ethyl ether acrylate, 2-(Dimethylamino)ethyl acrylate, 3-(Dimethylamino)propyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, (2-Isobutyl-2-methyl-1,3-dioxolan-4-yl)methyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 2-(chloromethyl)acrylate, Octadecyl acrylate, Pentabromobenzyl acrylate, Pentabromophenyl acrylate, Pentafluorophenyl acrylate, Poly(ethylene glycol) methyl ether acrylate, Poly(propylene glycol) acrylate, epoxidized acrylate, 3-Sulfopropyl acrylate, Tetrahydrofurfuryl acrylate, 2-Tetrahydropyranyl acrylate, 3,5,5-Trimethylhexyl acrylate, 10-Undecenyl acrylate, 4-Acetoxyphenethyl acrylate, 6-Acetylthiohexyl methacrylate, Acrylic anhydride, Acryloxyethyl thiocarbamoyl rhodamine B, 4-Acryloylmorpholine 97%, [2-(Acryloyloxy)ethyl]trimethylammonium chloride, 2-(4-Benzoyl-3-hydroxyphenoxy)ethyl acrylate, Benzyl acrylate, Benzyl 2-propylacrylate, Butyl acrylate, tert-Butyl acrylate, 2-[[(Butylamino)carbonyl]oxy]ethyl acrylate, tert-Butyl 2-bromoacrylate, 2-Carboxyethyl acrylate, 2-Chloroethyl acrylate, 2-(Diethylamino)ethyl acrylate, Di(ethylene glycol) ethyl ether acrylate, 2-(Dimethylamino) ethyl acrylate, 3-(Dimethylamino)propyl acrylate, Ethyl acrylate, 2-Ethylacryloyl chloride, Ethyl 2-(bromomethyl) acrylate, Ethyl cis-(β-cyano)acrylate, Ethylene glycol dicyclopentenyl, Ethylene glycol methyl ether acrylate, Ethylene glycol phenyl ether acrylate, Ethyl 2-ethylacrylate, 2-Ethylhexyl acrylate, Ethyl 2-propylacrylate, Hexyl acrylate, 4-Hydroxybutyl acrylate, 2-Hydroxyethyl acrylate 96%, 2-Hydroxy-3-phenoxypropyl acrylate, Isobornyl acrylate, Isobutyl acrylate, (2-Isobutyl-2-methyl-1,3-dioxolan-4-yl) methyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 2-(chloromethyl)acrylate, Methyl 3-hydroxy-2-methylenebutyrate, Octadecyl acrylate, Pentabromobenzyl acrylate, Pentabromophenyl acrylate, 3-Sulfopropyl acrylate, Tetrahydrofurfuryl acrylate, 2-Tetrahydropyranyl acrylate, 3,5,5-Trimethylhexyl acrylate, 10-Undecenyl acrylate, Acrylic acid, acrylonitrile, Benzyl methacrylate, 2-(2-Bromoisobutyryloxy)ethyl methacrylate, 2-(tert-Butylamino) ethyl methacrylate, Butyl methacrylate, tert-Butyl methacrylate, 3-Chloro-2-hydroxypropyl methacrylate, Cyclohexyl methacrylate, 3,3'-Diethoxypropyl methacrylate, 2-(Diethylamino)ethyl methacrylate, Diethylene glycol butyl ether methacrylate, Di(ethylene glycol) methyl ether methacrylate, 2-(Diisopropylamino)ethyl methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Ethyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxy-3-{3-[2,4,6,8-tetramethyl-4,6,8-tris(propyl glycidyl ether)-2-cyclotetrasiloxanyl]propoxy}propyl methacrylate, Isobornyl methacrylate, Isobutyl methacrylate, 2-Isocyanatoethyl methacrylate, Isodecyl methacrylate, Lauryl methacrylate, Methacrylic acid N-hydroxysuccinimide ester, 4-Methacryloxyethyl trimellitic anhydride, Methyl methacrylate, 2-(Methylthio)ethyl methacrylate, mono-2,2-N-Morpholinoethyl methacrylate, 1-Naphthyl methacrylate, Pentabromophenyl methacrylate, Phenyl methacrylate, Phosphoric acid 2-hydroxyethyl methacrylate ester, Poly (ethylene glycol) behenyl ether methacrylate, Poly(ethylene glycol) 2,4,6-tris(1-phenylethyl)phenyl ether methacrylate, Poly(propylene glycol) methacrylate, 2-[2-(3-Prop-1-en-2-ylphenyl)propan-2-ylcarbamoyloxy]ethyl methacrylate, Propyl methacrylate, 1-Pyrenemethyl methacrylate, Stearyl methacrylate, 3-Sulfopropyl methacrylate, TEMPO methacrylate, Tetrahydrofurfuryl methacrylate, Triethylene glycol methyl ether methacrylate, 3,3,5-Trimethylcyclohexyl methacrylate, Vinyl methacrylate, 3-(Acryloyloxy)-2-hydroxypropyl methacrylate, cyclohexyl methacrylate.

Other specific illustrative additional vinyl monomers include the following: 4-Acetoxystyrene, 4-Benzhydrylstyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butyl styrene, 2-Chlorostyrene, 3-Chlorostyrene, 4-Chlorostyrene, 2,6-Dichlorostyrene, 3,4-Dimethoxystyrene, 2,4-Dimethyl styrene, 2,5-Dimethyl styrene, N,N-Dimethylvinylbenzylamine, 4-(Diphenylphosphino)styrene, 4-Ethoxystyrene, 4-[N-(Methylaminoethyl) aminomethyl]styrene, 3-Methyl styrene, 4-Methyl styrene, α-Methylstyrene, 3-Nitrostyrene, 2,4,6-Trimethylstyrene.

Other specific illustrative additional vinyl monomers include the following: Sodium 4-vinylbenzoic acid, 3-Vinylaniline, 4-Vinylaniline, 9-Vinylanthracene, 4-Vinylbenzocyclobutene, 3-Vinylbenzoic acid, 4-Vinylbenzoic acid, Vinylbenzyl chloride, 4-Vinylbenzyl chloride, 4-Vinylbenzyl(triphenyl)phosphonium chloride, 4-Vinylbiphenyl, 2-Vinylnaphthalene, Vinyl acetate, Vinyl benzoate, Vinyl 4-tert-butylbenzoate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl valerate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol vinyl ether, Cyclohexyl vinyl ether, Di(ethylene glycol) divinyl ether, Di(ethylene glycol) vinyl ether, Diethyl vinyl orthoformate, Dodecyl vinyl ether, Ethylene glycol vinyl ether, 2-Ethylhexyl vinyl ether, Ethyl vinyl ether, Isobutyl vinyl ether, Phenyl vinyl ether, Propyl vinyl ether, N-Ethyl-2-vinylcarbazole, Ethyl vinyl sulfide, N-Methyl-N-vinylacetamide, 9-Vinylanthracene, 9-Vinylcarbazole, N-Vinylformamide, 2-Vinylnaphthalene, Vinylphosphonic acid, N-Vinylphthalimide, 2-Vinylpyridine, 4-Vinylpyridine, 1-Vinyl-2-pyrrolidinone, Vinylsulfonic acid.

Fluorinated vinyl monomers may also be used as the additional monomer, including the following: 2,2,3,3,4,4,5,5,6,6,7,7-Dodecafluoroheptyl acrylate, 3,3,4,4,5,5,6,6,7,7,8,8,9,9,10,10,11,11,12,12,12-Heneicosafluorododecyl acrylate, 3,3,4,4,5,5,6,6,7,7,8,8,9,9,10,10,10-Heptadecafluorodecyl methacrylate, 2,2,3,3,4,4,4-Heptafluorobutyl acrylate, 2,2,3,3,4,4,4-Heptafluorobutyl methacrylate, 2,2,3,4,4,4-Hexafluorobutyl acrylate, 1,1,1,3,3,3-Hexafluoroisopropyl acrylate, 2,2,3,3,4,4,5,5-Octafluoropentyl acrylate, 2,2,3,3,4,4,5,5-Octafluoropentyl methacrylate, Pentafluorophenyl acrylate, 2,2,3,3,3-Pentafluoropropyl acrylate, 2,2,3,3,3-Pentafluoropropyl methacrylate, 1H,1H,2H,2H-Perfluorodecyl acrylate, 2,2,3,3-Tetrafluoropropyl methacrylate, 3,3,4,4,5,5,6,6,7,7,8,8-Tridecafluorooctyl acrylate, 3,3,4,4,5,5,6,6,7,7,8,8,8-Tridecafluorooctyl methacrylate, 2,2,2-Trifluoroethyl methacrylate, Methyl 2-(trifluoromethyl)acrylate, 2-[3-(2H-Benzotriazol-2-yl)-4-hydroxyphenyl]ethyl methacrylate, Pentafluorophenyl methacrylate, 2-[(1',1',1'-Trifluoro-2'-(trifluoromethyl)-2'-hydroxy)propyl]-3-norbornyl methacrylate, 2,6-Difluorostyrene, 2-Fluorostyrene, 3-Fluorostyrene, 4-Fluorostyrene, Pentafluorophenyl 4-vinylbenzoate, 2,3,4,5,6-Pentafluorostyrene, 2-(Trifluoromethyl)styrene, 3-(Trifluoromethyl)styrene, 4-(Trifluoromethyl)styrene, Vinyl trifluoroacetate.

The additional vinyl monomer may comprise a nitrogen-containing group, including such monomers which have been disclosed above. For example, the vinyl monomer comprising the nitrogen-containing group may be dimethylaminoethyl methacrylate, diethylaminoethyl methacrylate, dipropylaminoethyl methacrylate, diisopropylaminoethyl methacrylate, or dibutylaminoethyl methacrylate.

The additional vinyl monomer may have acidic functionality, such as acrylic acids and methacrylic acids which have been disclosed above. For example, the vinyl monomer having acidic functionality may be β-carboxyethyl acrylate (β-CEA).

The additional vinyl monomer may comprise a sulfur-containing group, including such monomers which have been disclosed above. For example, the vinyl monomer comprising the sulfur-containing group may be styrenesulfonic acid, vinylsulfonate, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, or 2-acrylamido-2-methyl-1-propanesulfonic acid.

The additional vinyl monomer used may be of a single type or a combination of different types.

The selection of the multifunctional vinyl monomer and the additional vinyl monomer depends (as well as the amounts of the monomers), at least in part, upon the desired properties for the coating composition. The organic additives offer a greater degree of chemical diversity as compared to silica, and thus, afford wider range of properties for the coating compositions. By way of illustration, monomer selection may be guided by a desire that the coating composition (or coating formed therefrom) be hydrophobic (e.g., by using hydrophobic vinyl monomers such as styrene, alkyl methacrylate, etc.), lipophobic (e.g., by using lipophobic vinyl monomers such as fluorinated vinyl monomers), have a particular viscosity (e.g., by using a certain amount of monomers comprising hydrogen bonding moieties such as hydroxyl moieties and glycol moieties), have a particular hardness/scratch resistance (e.g., by using relatively high amounts of the multifunctional vinyl monomer), etc.

The selection of vinyl monomers and their amounts may also be guided by a desire that the organic additive (i.e., the polymeric material from which the organic additive is composed) has a particular refractive index. In general, homopolymers and copolymers based on the monomers disclosed herein have a refractive index in a range of from 1.30 to 1.71. By contrast, silica additives used in waterborne coatings have a very limited range of refractive indices, 1.45 to 1.46. Thus, use of the disclosed organic additives enables a much broader range of optical properties for coatings formed from the disclosed coating compositions. For example, the refractive index of the organic additive may be selected to match to (i.e., the same as) the binder (once cured) in the coating composition. By "same" it is meant within ±0.10, ±0.05, ±0.02, or ±0.01. This can improve the transparency of the resulting coating by reducing light scattering between the organic additive and the binder. As another example, the refractive index of the organic additive may be selected to provide a desired mismatch with the binder (once cured). This can reduce gloss of the resulting coating by increasing light scattering. In embodiments, the mismatch is at least 0.11, at least 0.2, at least 0.3, at least 0.4, or in a range of from 0.11 to 0.4 The disclosed refractive index values may refer to measurement of refractive index at a specific wavelength of light, e.g., 633 nm. The wavelength chosen for the refractive index measurement is one suitable for the application of the coating. For example, to provide a high clarity polymer film to visual inspection, as typical for many coating applications, the wavelength chose is optimally in the visual range. Refractive index may be measured by any suitable method, using an ASTM standard appropriate to the particular material, or using an appropriate commercial refractometer. In embodiments, refractive index can be measured by immersing the organic additive or binder (or coating formed therefrom) sequentially in standard fluids of known refractive index, and observing when the additive/binder is no longer visible in the standard fluid. Cargille Refractive Index Liquids is an example of a set of standards that can be utilized. In other embodiments, standard fluids of different refractive index can be prepared by mixing miscible fluids of known refractive indexes, such as glycerol and water. However, determining whether the refractive indices of the organic additive and binder are the same or mismatched may involve a different measurement technique, as long as the comparative measurements are performed the same way.

The selection of vinyl monomers and their amounts may also be guided by a desire to achieve compatibility with the other components (e.g., binder) of the coating composition or to facilitate an association between such components. This association may be covalent binding or noncovalent binding (e.g., hydrogen bonding, van der Waals, etc.). Compatibility may be achieved by selecting vinyl monomers that are chemically inert with respect to the other components. Compatibility may be achieved by including an amount of the binder in the organic additive itself. Association may be achieved by selecting vinyl monomers comprising functional groups which form covalent or noncovalent bonds with components of the coating composition. For example, (meth)acrylic acid monomers and β-CEA are vinyl monomers capable of forming covalent bonds with certain components of the coating composition.

Various polymerization techniques may be used to form the organic additive from the selected vinyl monomers, including emulsion polymerization techniques. In emulsion polymerization, an emulsion is formed comprising the selected vinyl monomers and generally, a solvent and a surfactant. An initiator may be included in the emulsion (or separately added in a distinct step). The emulsion is exposed to conditions which induce polymerization reactions between vinyl monomers to form the polymeric material from which the organic additive is composed. These conditions may include mixing for a period of time (e.g., from 1 minute to 72 hours, 4 hours to 24 hours) and at a particular temperature (e.g., 10° C. to 100° C., 20° C. to 90° C., 45° C. to 75° C.). An inert gas may be supplied during the polymerization reactions, e.g., nitrogen. The emulsion polymerization may be carried out in any suitable reactor.

The emulsion polymerization provides an organic additive latex, i.e., the organic additive as particles dispersed in the solvent. This is an advantage over silica which generally requires additional steps, e.g., high shear, to disperse it and incorporate it into a coating composition. The organic additive latex may be used as is, e.g., to be added with other components of the disclosed coating compositions. However, further processing steps may be used, e.g., to recover the organic additive from the solvent. These processing steps include, e.g., filtration, drying, centrifugation, spray drying, freeze drying, etc.

Water is generally used as the solvent in the emulsion, but other solvents may be included such as toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, and combinations thereof.

As noted above, a surfactant is generally used in the emulsion, including anionic, cationic, or nonionic surfactants. They may be present in the emulsion at an amount of from 0.01 to 15 weight percent of the total weight of the vinyl monomers, or from 0.1 to 10 weight percent of the total weight of the vinyl monomers. A single type or combinations of different types of surfactants may be used.

Anionic surfactants include sulfates and sulfonates such as sodium dodecyl sulfate (SDS) also known as sodium lauryl sulfate (SLS), sodium dodecylbenzene sulfonate, sodium dodecylnaphthalene sulfate, dialkyl benzenealkyl sulfates and sulfonates; acids such as abietic acid available from Aldrich, NEOGEN™, NEOGEN SC™ obtained from Daiichi Kogyo Seiyaku Co., Ltd. Other suitable anionic surfactants include DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates.

Cationic surfactants include ammoniums such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and $C_{12}$, $C_{15}$, $C_{17}$ trimethyl ammonium bromides. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, and SANISOL (benzalkonium chloride), available from Kao Chemicals. A suitable cationic surfactant includes SANISOL B-50 available from Kao Corp., which is primarily a benzyl dimethyl alkonium chloride.

Nonionic surfactants include alcohols, acids and ethers. For example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, and dialkylphenoxy poly(ethyleneoxy)ethanol may be used. Commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ may be used.

An initiator is generally used in the emulsion polymerization process to facilitate the polymerization reactions. They may be present in (or added to) the emulsion at an amount of from 0.1 to 8 weight percent of the total weight of the vinyl monomers, or from 0.2 to 5 weight percent of the total weight of the vinyl monomers. A single type or combinations of different types of initiators may be used.

Suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, and 2-2'-azobis isobutyramide dehydrate. Other water-soluble initiators include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methylpropionamidine] dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2' azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, and 2,2'-azobis{2-[1-(2-hydroxyethyl)-2-imidazolin-2-yl]propane}dihydrochloride.

The organic additives formed by the emulsion polymerization techniques described above may be characterized by their composition. As noted above, the polymeric material of the organic additive is the result of polymerization reactions between various combinations of vinyl monomers to form a polymerization product. For clarity, the composition of the polymeric material/organic additive may be identified by reference to the vinyl monomers which are polymerized, recognizing that the chemical form of those monomers is generally altered as a result of the polymerization reactions. The polymerization product, and thus, the organic additive, may comprise other components present in the emulsion described above. For example, initiators (or a portion thereof, e.g., a sulphate group) may become incorporated at the beginning and end of polymer chains. Surfactants may become entangled with polymer chains and embedded within the organic additive particles, e.g., due to strong noncovalent binding.

In embodiments, the organic additive comprises (or consists of) a polymerization product of reactants comprising a multifunctional vinyl monomer, an additional vinyl monomer, and optionally, an initiator. Any of the multifunctional vinyl monomers, additional vinyl monomers, and initiators described herein may be used. In any of these embodiments, a surfactant may be present in the organic additive, e.g., embedded within. Any of the surfactants described herein may be used. In any of these embodiments, the multifunctional vinyl monomer may be present in an amount of from 2 to 99 by weight percent of the total weight of solids (including total vinyl monomers, surfactant (if present)). This includes from 5 to 90 by weight percent, from 10 to 80 by weight percent, and from 25 to 70 weight percent. If more than one type of multifunctional vinyl monomer is used, these values refer to the total amount of multifunctional vinyl monomer. In any of these embodiments, the additional vinyl monomer may be present in an amount of from 0 to 97 by weight percent of the total weight of solids. This includes from 1 to 90 by weight percent, from 10 to 80 by weight percent, and from 25 to 70 weight percent. If more than one type of additional vinyl monomer is used, these values refer to the total amount of additional vinyl monomer. In any of these embodiments, the surfactant may be present in an amount of from 0 to 10 by weight percent of the total weight of solids. This includes from 0.1 to 8 by weight percent and from 1 to 6 by weight percent.

In any of the embodiments referenced in the paragraph above, one or more of the following variations may be used. Divinyl benzene may be used as the multifunctional vinyl monomer (or one of the multifunctional vinyl monomers). An acrylate or a methacrylate may be used as the additional vinyl monomer (or one of the additional vinyl monomers). A fluorinated vinyl monomer (e.g., trifluoroethyl (meth)acrylate) may be used as the additional vinyl monomer (or one of the additional vinyl monomers). A monomer comprising a sulfur-containing group may be used as the additional vinyl monomer (or one of the additional vinyl monomers). A monomer comprising a nitrogen-containing group may be used as the additional vinyl monomer (or one of the additional vinyl monomers), and at an amount of from 0.1 to 1.5 weight percent of the total weight of solids (as defined above). A monomer having acidic functionality (e.g., acrylic acid, methacrylic acid, or β-CEA) may be used as the additional vinyl monomer (or one of the additional vinyl monomers), and at an amount of from 0.1 to 10 weight percent of the total weight of solids.

The organic additives may be characterized by their size and morphology. As noted above, they are particulate in form. They are generally spherical in shape, but this does not mean perfectly spherical, as some particles may have ellipsoid, ovoid, or irregular shapes. The size of the organic additive particles may be reported as a $D_{50}$ particle size, which refers to a diameter at which 50% of the sample (on a volume basis) is comprised of particles having a diameter less than said diameter value. In embodiments, the organic additive has a $D_{50}$ particle size in a range of from 20 nm to 500 nm, 25 nm to 200 nm, or from 40 nm to 150 nm. The $D_{50}$ particle size may be measured using a Nanotrac 252 instrument. This instrument uses a laser light-scattering technique, in which Doppler-shifted light generated from each particle in motion (Brownian motion) is measured. The signals generated by these shifts are proportional to the size of the particles. The signals are mathematically converted to particle size and size distribution. The analysis can be performed using an external probe or by inserting the probe into a fixed sample chamber. For light scattering techniques, NIST polystyrene Nanosphere control samples with a diameter within the range of 15 mm to 150 mm under the tradename NIST Traceable Reference Material for Nanotrac Particle Size Analyzers obtained from Microtrac may be used.

For the same size, the embodiments of the organic additive provide a greater surface area as compared to silica. For example, the Brunauer-Emmett-Teller (BET) value for about 65 nm silica particles is about 80 m²/g. An organic additive particle of the same size composed of about 70 weight percent trifluoroethyl methacrylate and about 30 weight percent divinylbenzene has a BET value of about 120 m²/g. Moreover, silica tends to aggregate, leading to a loss in surface area and/or a detrimental increase in viscosity. Embodiments of the organic additives do not suffer from such problems.

The organic additives may be characterized by their degree of crosslinking. The degree of crosslinking may be given by calculating the number of crosslinks per unit of vinyl monomer in the coating composition. For an organic additive in which the crosslinking is provided by using a difunctional vinyl monomer, this can be calculated using the equation below, where Mc is the molecular weight of the difunctional vinyl monomer, Xc is the weight fraction of difunctional vinyl monomer with respect to total amount of vinyl monomer, and the sum is over all vinyl monomers, i=1 to n, where Mi is the molecular weight of the vinyl monomer i and, Xi is the weight fraction of vinyl monomer i with respect to total amount of vinyl monomer.

$$\text{Crosslink density} = \frac{M_c/X_c}{\sum_{i=1}^{n} M_i/X_i}$$

For an organic additive in which the crosslinking is provided by using a vinyl monomer with greater functionality than two, the degree of crosslinking may be calculated the same way, except modified by a factor associated with the number of crosslinks formed. For example, for a trifunctional vinyl monomer, crosslink density value must be multiplied by two, since each trifunctional vinyl monomer creates two crosslinks. Similarly, a quaternary vinyl monomer has three times the crosslink density of a difunctional vinyl monomer and so the crosslink density value must be multiplied by three.

In embodiments, the degree of crosslinking (crosslink density value) is from 0.03 to 0.60. This includes from 0.05 to 0.50, from 0.10 to 0.40, and from 0.20 to 0.40.

The organic additives may be characterized by their gel fraction. The gel fraction may be measured as follows, using a gravimetric technique. An organic additive latex is dissolved in toluene then filtered by vacuum filtration. The collecting membrane is dried and weighed and the remaining material on the membrane is weighed for percent gel retained. An example of a detailed procedure is as follows. Weigh out 0.04 g±0.001 g (W1) of resin into a scintillation vial, add 20 mL of toluene to each vial, shake for 4 hours. Place one glass filter (for example, Whatman glass filter paper 4.25 cm type GF/a) and one Teflon filter (for example MSI Micro Teflon filters 47 mm type PTEF) in an aluminum pan and record the weight (W2). Setup a vacuum glass filter funnel, wet the filter support with toluene, place the Teflon filter on wet filter pad, shiny side down. Place the glass filter on Teflon filter. Take samples off the shaker, and pour the solution from the vial onto the filter paper. Empty contents of vial and rinse vial with 10 mL of toluene, rinse glass funnel with toluene sparingly. Remove wet filter papers and place into aluminum dishes, dry overnight. Weigh the crucible (W3) and determine the percent toluene insoluble. Calculation of total toluene insoluble is determined as: % Total Toluene Insolubles=[(W3)−(W2)/(W1)]*100. The percent total toluene insoluble is the gel fraction.

In embodiments, the gel fraction is from 40% to 100%, from 40% to 90%, from 50% to 95%, from 75% to 99%, from 80% to 100%, or from 90% to 100%.

The organic additive may be used in the coating composition at various amounts, e.g., depending upon the desired property for a coating formed therefrom. In embodiments, the organic additive is present in the coating composition an amount of from 2 to 25 weight percent, from 5 to 20 weight percent, and from 2 to 10 weight percent of the total weight of the coating composition. This amount refers to the solids content of the organic additive (as opposed to the amount of an organic additive latex). If different types of organic additives are used, this amount refers to the total amount of organic additives. The other components of the coating composition are described below.

Compared to silica, e.g., fumed silica having a density of 2.2 g/mL the density of the organic additives can be significantly lower and cover a broader range, e.g., from 0.9 g/mL to 2.2 g/mL This means that, in embodiments, a smaller amount of the organic additive may be used as compared to silica to provide the same property, e.g., reinforcement which depends upon volume fraction as opposed to weight fraction.

The coating composition comprises water. However, the water may be one component of a solvent system comprising water-soluble or water-miscible organic solvents such as alcohols, ketones, glycols, glycol ethers, glycol ether esters, N-methyl pyrrolidone, etc. A single type or a combination of different types of such solvents may be used. The coating composition generally comprises a relatively large amount of water. In embodiments, the solvent system in the coating composition comprises at least 50% water, at least 60% water, at least 70% by water, or at least 80% by water (on a volume basis). The total amount of solvent, including water, in the coating composition may be, e.g., in a range of from 10 to 80 weight percent, from 20 to 70 weight percent, or from 30 to 60 weight percent of the total weight of the coating composition.

The coating composition also comprises a binder. The term "binder" refers to the prepolymers which form a cured polymer upon exposing the prepolymers to conditions to cure the prepolymers. These prepolymers may be monomers, oligomers, and/or polymers which undergo additional chemical reactions upon curing, including those that involve the formation of covalent bonds (i.e., crosslinks) between prepolymers. However, these prepolymers may be oligomers and/or polymers in the form of particles that coalesce (e.g., latex particle coalescence induced by drying capillary forces) upon curing. Thus, at least in embodiments, the binder refers to prepolymers that are in their uncured state in the coating composition. In the coating composition, unlike the organic additives which are crosslinked, the binder is generally not crosslinked. However, such crosslinks may form during curing to form the polymer from the binder/prepolymers.

It is noted that certain organic additives have been used in xerographic toners. However, the present coating compositions are not toners and the binders in the present coating compositions are not toner particles. Furthermore, the function of the organic additives in xerographic toners is entirely different from the function of the organic additives in the present coating compositions. Similarly, in embodiments, the coating compositions are not aqueous inkjet ink compositions and the binders are not resin or polymers in such aqueous inkjet ink compositions.

Various binders may be used, including acrylics, melamine, polyesters, polyacrylates, alkyds, epoxies, epoxy esters, polyol, polyisocyanate, polyurethane, silicones, silicates, vinyl propionate copolymers, vinyl acetate copolymers, acrylate-methacrylate copolymers, styrene-butadiene copolymers, polyvinyl acetate, and polystyrene. A single type or a combination of different types of binders may be used. In embodiments, the binder comprises a styrene-butadiene copolymer, an acrylic, an alkyd, polyvinyl acetate, a polystyrene, or combinations thereof. The total amount of binder in the coating composition may be, e.g., in a range of from 20 to 88 weight percent of the total weight of the coating composition. This includes from 30 to 80 weight percent and from 40 to 60 weight percent.

The coating composition may comprise a colorant. The colorant is generally a pigment, although dyes and combinations thereof may be used. Illustrative pigments include black pigments, cyan pigments, magenta pigments, and yellow pigments. Pigments can be organic or inorganic particles. Suitable inorganic pigments include carbon black (further described below). However, other inorganic pigments may be suitable such as cobalt blue ($CoO-Al_2O_3$), chrome yellow ($PbCrO_4$), iron oxide, titanium oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. Carbon pigments include carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation). Examples of special effects pigments include ECKART America Corporation STAPA UCP pigments, pigments from Silberline Manufacturing, such as SILBERCOTE AquaPellet and STARBRITE Reveal AQ; Sun Chemical's Benda-Lutz COMPAL WS aluminum pigments; pigments from New Brook International, including bismuth vanadate, fluorescents, glow-in-the dark, iron oxides, lithopone, metallic (aluminum and bronze), anti-corrosive pigments, such as micaceous iron oxide and Pigmentan® (magnesium based) pigment.

Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, diazo dyes, phthalocyanine derivatives, including various phthalocyanine sulfonate salts, aza(18)annulenes, formazan copper complexes, and triphenodioxazines The total amount of colorant in the coating composition may be, e.g., in a range of from 0 to 10 weight percent of the total weight of the coating composition. This includes from 0.1 to 10 weight percent, and from 0.1 to 5 weight percent.

The coating composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from about 50° C. to about 150° C. may be used. Nanoscale (e.g., diameter of 1000 nm or less, 500 nm or less, or 100 nm or less) wax emulsions based on carnauba wax and paraffin wax may be used, including those from Michelman (e.g., Michem Lube 103DI, 124, 124P135,156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer532, Aquacer 535, Aquacer 537, Aquacer 539, and Aquacer 593.

The total amount of wax in the coating composition may be, e.g., in a range of from 0 to 10 weight percent of the total weight of the coating composition. This includes from 0.1 to 10 weight percent, and from 0.1 to 5 weight percent.

Additives

The coating composition may comprise an additive (distinct from the organic additive). For example, inorganic particles may be used as an additive, including oxide particles. The particles may be spherical in shape (spherical has been defined above). The particles may have a $D_{50}$ particle size in a range of from 10 nm to 500 nm. Various oxides may be used such as silica, titania, zirconia, alumina, iron oxides, copper oxide, tin oxide, boron oxide, cerium oxide, thallium oxide, tungsten oxide, titanates, and combinations thereof. Mixed oxides may be used such as aluminosilicates, borosilicates, and aluminoborosilicates, and combinations thereof. Regarding silica, the $D_{50}$ particles sizes above may refer to the primary particle (as opposed to aggregates and agglomerates formed from such particles). Various types of silicas may be used, including silica gel, precipitated silica, fumed silica, and combinations thereof. The oxide particles may be functionalized (e.g., via a hydrophobic surface treatment) or unfunctionalized. A single type or combinations of different types of inorganic particles may be used. Although embodiments of the coating composition do comprise inorganic particles, in other embodiments, the coating composition is free of (i.e., does not comprise) inorganic particles. In embodiments, the coating composition is free of silica.

The total amount of inorganic particles in the coating composition may be, e.g., in a range of from 0 to 20 weight percent of the total weight of the coating composition. This includes from 0.1 to 10 weight percent, and from 0.1 to 5 weight percent.

Other additives which may be included in the coating composition include additives to facilitate curing of the binder. Such additives include catalysts, and hardeners (curing agents). The specific types of catalysts and hardeners may be selected based on the type of binder. Each of these types of additives may be present in the coating composition in an amount, e.g., of from 0 to 10 weight percent of the total weight of the coating composition. This includes from 0.1 to 10 weight percent, and from 0.1 to 5 weight percent.

Other additives which may be included in the coating composition include additives such as biocides; fungicides; stabilizers; pH controlling agents such as acids or bases, phosphate salts, carboxylates salts, sulfite salts, amine salts, buffer solutions; sequestering agents such as EDTA (ethylenediamine tetra acetic acid); defoamers; and wetting agents. Each of these types of additives may be present in the coating composition in an amount, e.g., of from 0 to 10 weight percent of the total weight of the coating composition. This includes from 0.1 to 10 weight percent, and from 0.1 to 5 weight percent.

In embodiments, the coating composition comprises (or consists of) a solvent system; an organic additive; a binder; optionally, one or more of a colorant, a wax, and an additive. In embodiments, the coating composition comprises (or consists of) a solvent system; an organic additive; a binder; a colorant; and optionally, one or more of a wax and an additive. In any of these embodiments, a single type or different types of each component may be used. In any of these embodiments, the components may be selected from any of the solvent systems, organic additives, binders, colorants, waxes, and additives disclosed herein. However, in embodiments, the additive is not silica or the additive is not inorganic particles. In any of these embodiments, amounts of the components may be used as described above.

The coating compositions may be formed by combining the desired components at the desired amounts and mixing. Components which are in solid form, e.g., organic additives, wax, etc., may be provided and added as a dispersion of the solid in a solvent (e.g., water), such as adding the organic additive as an organic additive latex. Certain components of the coating composition may be provided together as a separate formulation, e.g., a binder formulation comprising a solvent system, a binder, and optionally, one or more of a colorant, a wax, and an additive. In such embodiments, the organic additive (or organic additive latex) may be added to this binder formulation at the desired amount and mixed. A variety of commercially available binder formulations may be used. By way of illustration, a commercially available paint was used as the binder formulation in the Example, below. Commercially available binder formulations may include silica. In embodiments, the same binder formulations are used except the silica is omitted.

The coating compositions may be used in a variety of industries to provide coatings on machinery, vehicles (e.g., automobiles), floors, walls, etc. As shown in FIG. 1, any of the coating compositions may be applied onto a surface 102 of substrate 100 to form a coating 104 thereon. The substrate 100 is not particularly limited and depends upon the application and the components of the coating composition, e.g., the binder type. Illustrative substrate materials include metal, glass, plastics, wood, etc. A variety of application techniques may be used, e.g., spreading, painting, brushing, wiping, spraying, dipping, etc. Although not shown in FIG. 1, a second substrate may be placed on the coating 104. In such embodiments, the coating 104 may function to adhere the two substrates together.

In whichever environment and for whichever application they are to be used, the coating compositions (or coatings formed therefrom) are generally subsequently cured to form a cured coating. (The phrase "cured coating" distinguishes the "coating," which refers to a layer of the coating composition after application to a substrate.) As noted above, curing is induced by application of curing conditions. This curing may involve formation of crosslinks and thus, the cured coating may be crosslinked. The curing conditions, in turn, depend upon the components of the coating composition, e.g., the binder type. By way of illustration, curing may be induced by heating for a period of time; exposing to water (e.g., for silicones); adding a hardener (curing agent); etc. In other embodiments, simply exposing the coating to ambient conditions (e.g., air at room temperature and atmospheric pressure) for a period of time is sufficient to induce curing.

In addition to the organic additives and coating compositions described above, the coatings, cured coatings, and coated substrates are also encompassed by the present disclosure.

EXAMPLE

The following Example is being submitted to further define various species of the present disclosure. The Example is intended to be illustrative only and are not intended to limit the scope of the present disclosure. Also, parts and percentages are by weight unless otherwise indicated. As used herein, "room temperature" refers to a temperature of from about 20° C. to about 25° C.

An organic additive latex was formed as follows. In a 3000-Gal reactor, equipped with two HE3 type impellers and a condenser, 26.3 kg of sodium lauryl sulfate (SLS) surfactant (at 30% solids) was added to 5711 kg deionized water (DIW). The reactor was deoxygenated by passing a stream of nitrogen through it during the reaction, as well, a condenser was used. The reactor was ramped to 77° C. and the rpm was set to 65. Separately, in a 2000-Gal reactor, equipped with two HE3 type impellers, a monomer emulsion was prepared by mixing (at 100 rpm) 1659 kg cyclohexyl methacrylate (CHMA), 559 kg divinyl benzene (DVB), 17.9 kg dimethylaminoethyl methacrylate (DMAEMA), 64.3 kg SLS surfactant (at 30% solids) and 2913 kg DIW together. A 261 kg seed was pumped from the monomer emulsion into the 3000-Gal reactor at 77° C. An initiator solution was prepared from 8.5 kg of ammonium persulfate (APS) in 240 kg of DIW and this solution was added over 20 minutes into the 3000-Gal reactor. Then the remaining monomer emulsion was fed into the 3000-Gal reactor over 120 min. At the end of the monomer feed, the condenser is turned off and rpm is further increased to 75 rpm. The latex undergoes a post-processing protocol of 1 hr at 77° C. followed by a 2 hr ramp to 87° C. and a 1 hr hold at 87° C. to reduce residual monomer at the end of the emulsion polymerization step. During the post-processing protocol, the latex was also pH adjusted to ≥6.0 every 30 minutes with a 0.1 wt % solution of NaOH. The resultant latex containing 19.7% solids with a particle size of 87 nm was obtained and filtered through a 25-micron filter sieve.

In a 250 ml bottle, 55 g of the above resultant organic additive latex was added to 109 g of paint. Thus, 10% organic additive solids were added to a yellow latex paint (Sherwin Williams Promar200 Zero VOC—colour L1 Blue, N1 Raw Umber, Y1 Yellow, with egg-shell gloss) to form a coating composition. The coating composition was brushed onto a heavy coated paper to form a coating thereon. Two sheets of heavy coated paper were prepared in this way with this composition. The coated paper was allowed to dry under ambient conditions. A control composition (no organic additive) was also brushed onto on the heavy coated paper. Two sheets of the heavy coated paper were prepared in this way with the control composition. Gloss was measured for each sheet at a 75° angle. To measure gloss, a Novo-Gloss triple-angle gloss meter from Rhopoint Instruments measuring at 75° angle was used to collect the data in Table 1, below. In this Table, "S" refers to measuring gloss in the same direction as the brushing application direction, "P" refers to brushing application in the perpendicular direction to the brushing application. The two pages measured for the control are labelled Control Sheet 1 and Control Sheet 2, and the two pages measured with the organic additive are labelled Coating Composition with Organic Additive Sheet 1 and Sheet 2. Four measurements were taken on each page for each of the "S" and "P" directions, which are the first four rows of data in the table.

TABLE 1

Gloss Measurements. The bold values in the last row are average values.

| Control Sheet 1 | | Control Sheet 2 | | Coating Composition with Organic Additive Sheet 1 | | Coating Composition with Organic Additive Sheet 2 | |
| --- | --- | --- | --- | --- | --- | --- | --- |
| S | P | S | P | S | P | S | P |
| 28.2 | 26.9 | 27.2 | 25.1 | 17.6 | 16.3 | 17.4 | 16.0 |
| 27.5 | 27.2 | 27.6 | 25.1 | 17.8 | 16.6 | 17.3 | 16.0 |
| 28.0 | 27.4 | 27.3 | 25.7 | 17.5 | 16.5 | 17.3 | 15.9 |
| 28.2 | 28.6 | 27.0 | 25.7 | 17.6 | 16.4 | 16.7 | 15.7 |
| 28.0 | 27.5 | 27.3 | 25.4 | 17.6 | 16.5 | 17.2 | 15.9 |

The gloss measurements show that, surprisingly, the organic additive was able to significantly reduce gloss as compared to the control composition. This was surprising as the commercial aqueous paint was already relatively low gloss, with an egg shell finish. A further reduction in gloss was not expected.

For each of the Control Sheet 1 and the Coating Composition with Organic Additive Sheet 1, a wear-rate abrasion test was done using a Taber wear rate test. For the Taber wear rate test a Taber Rotary Abrader, Model 5130 was utilized with CS-10 abrasion wheels. The environment for the test was 22.1° C. and 8.7% relative humidity (RH). The load was 500 grams, consisting of a 250-gram external weight and the 250-gram arm weight. The CS10-rolls were new and are broken in with a 50-cycle resurfacing with 5-11 disks. The break-in procedure is run twice for the new wheel. Before the test the sample is placed on holder several times to ensure the sample plate fits and to remove any excess coating. The test specimen is weighed, placed on the abrader, and locked in place. The wheels and vacuum nozzle were lowered and the cycles set to 100. The 100 test cycles are run, the sample removed and lightly brushed on both sides, before weighing the test specimen. The 100-cycle run and the weighing of the test specimen is repeated to 500 cycles. After 500 cycles a single 50 cycle resurfacing of the wheels with the S-11 disks is done. The test then is repeated up to 1000 cycles. The Taber Wear Index abrader indicates the rate of wear, and is calculated by measuring the loss in weight in milligrams per thousand cycles of abrasion. The lower the wear index, the better the abrasion resistance. The Taber Wear Index, TWI=[(A−B)*1000]/C, where A=weight in milligrams of specimen before abrasion, B=weight in milligrams of specimen after abrasion, and C=number of test cycles. At each 100 cycle point the Coating Composition with Organic Additive Sheet 1 showed less wear than the Control Sheet 1. At the end of 100 cycles, the Control Sheet 1 had a Taber Wear Index was 67.1 and for the Coating Composition with Organic Additive Sheet 1 the wear index was 56.2, an improvement of about 16%. These results were also surprising, as this commercial paint had already been optimized for improved wear and scratch resistance. Such a strong improvement in the wear resistance of the paint coating was not expected.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A coating composition comprising:
a solvent system comprising water;
a crosslinked organic additive in the form of particles and comprising a polymerization product of reactants comprising a multifunctional vinyl monomer comprising two or more vinyl groups, wherein the particles have a $D_{50}$ particle size in a range of from 20 nm to 500 nm;
a binder; and
optionally, one or more of a colorant and a wax.

2. The coating composition of claim 1, wherein the reactants further comprise an additional monofunctional vinyl monomer.

3. The coating composition of claim 1, wherein the binder is in its uncured state.

4. The coating composition of claim 1, wherein the crosslinked organic additive has a refractive index that is matched to the binder in its cured state.

5. The coating composition of claim 1, wherein the crosslinked organic additive has a refractive index that is mismatched to the binder in its cured state by at least about 0.11.

6. The coating composition of claim 1, wherein the crosslinked organic additive is characterized by a gel fraction in a range of from about 40% to about 100%; the crosslinked organic additive is characterized by a degree of crosslinking in a range of from about 0.03 to about 0.60; or both.

7. The coating composition of claim 2, wherein the additional monofunctional vinyl monomer comprises a functional group capable of covalently binding to the binder in its cured state.

8. The coating composition of claim 7, wherein the additional monofunctional vinyl monomer has acid functionality.

9. The coating composition of claim 8, wherein the additional monofunctional vinyl monomer is (meth)acrylic acid, β-carboxyethyl acrylate, or combinations thereof.

10. The coating composition of claim 1, wherein the crosslinked organic additive comprises surfactant embedded within the particles.

11. The coating composition of claim 1, wherein the coating composition is a paint.

12. The coating composition of claim 1, wherein the coating composition is free of silica.

13. The coating composition of claim 1, wherein the multifunctional vinyl monomer is divinyl benzene.

14. The coating composition of claim 2, wherein the additional monofunctional vinyl monomer is selected from acrylic monomers.

15. The coating composition of claim 14, wherein the acrylic monomers comprise a (meth)acrylate.

16. The coating composition of claim 2, wherein the additional monofunctional vinyl monomer comprises a nitrogen-containing group or a sulfur-containing group.

17. A paint comprising:
a solvent system comprising water;
a crosslinked organic additive in the form of particles and comprising a polymerization product of reactants comprising a multifunctional vinyl monomer comprising two or more vinyl groups, wherein the reactants consist of cyclohexyl methacrylate, divinyl benzene, dimethylaminoethyl methacrylate, and an initiator;
a binder; and
a colorant.

18. The paint of claim 17, wherein the crosslinked organic additive consists of the polymerization product of the reactants and surfactant embedded within the particles, and further wherein the paint is free of silica.

19. The coating composition of claim 1, wherein the $D_{50}$ particle size is from 40 nm to 150 nm.

20. The coating composition of claim 1, wherein the reactants consist of cyclohexyl methacrylate, divinyl benzene, dimethylaminoethyl methacrylate, and an initiator.

* * * * *